Patented Feb. 29, 1944

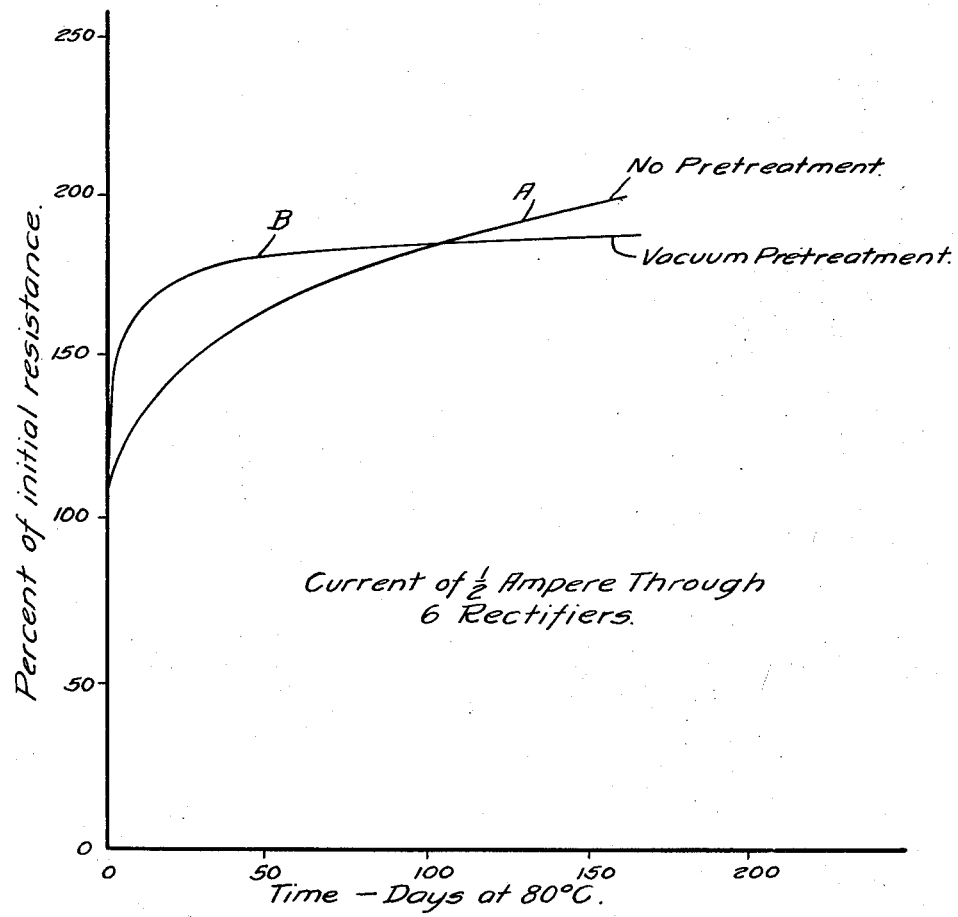

2,342,734

UNITED STATES PATENT OFFICE 2,342,734

COPPER OXIDE RECTIFIER

Carl C. Hein, Forest Hills, Pa., assignor to Westinghouse Electric & Manufacturing Company, East Pittsburgh, Pa., a corporation of Pennsylvania Application August 23, 1941, Serial No. 408,057

8 Claims. (Cl. 175—366)

My invention relates to copper oxide rectifiers and, in particular, relates to methods of heat treating such rectifiers to render their electrical characteristics less liable to variation with time.

One object of my invention is to provide a method of manufacturing copper oxide rectifiers which shall make it possible to operate them with a higher direct-current wattage output than has been possible with copper oxide rectifiers of the prior art.

Another object of my invention is to provide a method of manufacturing copper oxide rectifiers which shall decrease the tendency of rectifier disks of a given size when operated at a relatively high wattage output to vary in internal electrical resistance in the course of continued use.

Another object of my invention is to provide a method of manufacturing copper oxide rectifiers which shall render their electrical characteristics less subject to change with time when operating at comparatively elevated temperatures.

Other objects of my invention will become apparent upon reading the following specification, taken in connection with the drawing in which the single figure is a diagram illustrating the variation of internal resistance in the conductive direction at a fixed current with passage of time for rectifier disks manufactured by two different methods, the rectifiers being maintained at an artificially elevated temperature.

Copper oxide rectifiers may, in accordance with the disclosure of Grondahl Patent No. 1,640,335, be manufactured by oxidizing plates of copper in air at a temperature not far below the melting point of the copper, cooling the oxidized disks to room temperature and removing the overlying layer of cupric oxide. As is described in Geiger Patent No. 1,892,832, the oxidized copper may be transferred while just below its melting point to an air-filled furnace, heated to about 600° C. and allowed to cool to near the latter temperature; thereafter being plunged into a tank of cold water.

It is found that when copper oxide disks manufactured in the way last mentioned and made up into rectifiers of the form described in the Grondahl and Geiger patents are operated to supply current continuously to a load, their internal resistance undergoes a gradual increase in the course of time. This is objectionable in that it causes the efficiency of the rectifier to gradually decrease, and also causes a gradual increase in the amount of heat generated within the rectifier disks. The heat generated within the rectifier disks naturally causes a rise in their temperature and sets a serious limitation on the wattage of the direct-current output which they can supply. If the temperature of the disks is allowed to rise too high, they will, in fact, undergo an electrical breakdown and be ruined. To take care of this situation, various means of dissipating heat from the rectifier disks are used, and the wattage output which they can supply is limited by the amount of heat which can be dissipated without such a rise in their temperature that there is a danger of their undergoing breakdown.

It has been found that the rate of increase of resistance of the rectifier disks gradually decreases with time, and that the more rapid increase found during the earlier days or weeks of the rectifier operation can be accelerated by operating the rectifiers in an environment of artificially elevated temperature; for example, at a temperature of 100° C. However temperatures up to 140° C. may be desirable for certain conditions of use; and temperatures of 80° C. and even below that down to room temperature are still effective in others. In this way, the greater part of the change of internal resistance can be caused to take place within a comparatively short time at the factory of the manufacturer, and the disks then sent out to consumers who will find only a relatively small variation of their internal resistance in the course of subsequent use. The curve A in the figure of drawing represents the variation of the internal resistance of a rectifier manufactured by the method above described, with the lapse of time in days at an operating temperature of 80° C. The abscissae represent the lapse of time in days and the ordinates represent the internal resistance of the rectifier in percent of its initial resistance.

My application, Serial No. 286,613, for Copper oxide rectifiers, filed July 26, 1939, and assigned to the Westinghouse Electric & Manufacturing Company of East Pittsburgh, Pennsylvania, describes a novel method of manufacturing copper oxide rectifier disks which is an improvement on the methods described in the Grondahl and Geiger patents above mentioned. In accordance with my above-mentioned application, the copper blanks before oxidation are heated to a temperature between 500° C. and the fusing point of copper in a vacuum; for one example, a pressure of the order of 30 microns. It is preferable that this heating should continue for a substantial time interval; for example periods up to three hours have been found useful, although periods of a few minutes are effective for many types of unit.

When copper oxide rectifiers are given this vacuum pre-treatment and subsequently oxidized in accordance with the description in the Geiger patent, I have found that the resistance in the conductive direction through the rectifier decreases very materially and that the resistance in the non-conductive direction through the rectifier substantially increases; and that the rectifier can furnish direct-current outputs of from six to eight times as great in watts as rectifiers made by the prior art methods. I have also found that the characteristics of the rectifiers made by my above-mentioned vacuum treatment to be otherwise substantially different from those of rectifiers made by the prior art methods.

Experiments with my vacuum pre-treated rectifiers have further shown that operation in an artificially increased ambient temperature of the order of 80° C. causes their internal resistance to increase to a substantial maximum value in the course of a few days and to thereafter remain comparatively constant for long periods of time. The final increase of resistance in my vacuum pre-treated disks is likewise a smaller percentage of their initial resistance than is the increase of resistance of rectifiers made in accordance with the prior art. This is illustrated by the curve B in the drawing which shows the increase of internal resistance of rectifiers made in accordance with my vacuum pre-treatment process in the course of time plotted to the same scale as the curve A already mentioned.

As a result of the greater stability in respect to internal resistance of my vacuum pre-treated rectifiers, it is possible to operate them for long periods of time at a higher wattage of direct-current output than is possible with the case of rectifiers made by the methods of the prior art. For example, a rectifier having an output of 26 volts at one ampere, corresponding to 26 watts output, was obtained on disks made in accordance with my above-mentioned vacuum pre-treatment method, whereas a rectifier of the same size made by methods of the prior art yielded only 9 volts at one-half an ampere, corresponding to 4½ watts output. Thus my improved rectifier gives an output nearly six times as great as that possible with those of the prior art.

I have further found that the electrical efficiency of my above-mentioned vacuum pre-treatment rectifier is much more constant than that of the prior art rectifiers, being substantially invariable after the first ten days of its operation.

I claim as my invention:

1. The method of manufacturing copper oxide rectifiers which comprises heating a copper blank for a substantial time interval at a vacuum pressure at a temperature between 500° C. and the fusing temperature of copper, thereafter oxidizing said blank at a temperature up to the melting point of copper in an atmosphere containing oxygen, cooling said blank to a temperature of the order of room temperature and maintaining it at a temperature of the order of 100° C. for an extended period.

2. The method of manufacturing copper oxide rectifiers which comprises heating a copper blank for a substantial time interval at a vacuum pressure at a temperature between 500° C. and the fusing temperature of copper, thereafter oxidizing said blank at a temperature up to the melting point of copper in an atmosphere containing oxygen, cooling said blank to a temperature of the order of room temperature and maintaining it at a temperature of the order of 100° C. for a period of the order of days in duration.

3. The method of manufacturing copper oxide rectifiers which comprises heating a copper blank for a substantial time interval at a vacuum pressure at a temperature between 500° C. and the fusing temperature of copper, thereafter oxidizing said blank at a temperature up to the melting point of copper in an atmosphere containing oxygen, cooling said blank to a temperature of the order of room temperature, removing any cupric oxide present from the surface of said blank, providing electrical contacts to the mother metal of the blank and to the outer surface of the cupric oxide layer, and raising the unit thus produced to a temperature of the order of 100° C. and maintaining it at the last-mentioned temperature for a long time.

4. The method of manufacturing copper oxide rectifiers which comprises heating a copper blank for a substantial time interval at a vacuum pressure at a temperature between 500° C. and the fusing temperature of copper, thereafter oxidizing said blank at a temperature up to the melting point of copper in an atmosphere containing oxygen, cooling said blank to a temperature of the order of room temperature, removing any cupric oxide present from the surface of said blank, providing electrical contacts to the mother metal of the blank and to the outer surface of the cuprous oxide layer, and raising the unit thus produced to a temperature of the order of 100° C. and maintaining it at the last-mentioned temperature for a period of the order of days in duration.

5. The method of manufacturing copper oxide rectifiers which comprises heating a copper blank for a substantial time interval at a vacuum pressure at a temperature between 500° C. and the fusing temperature of copper, thereafter oxidizing said blank at a temperature up to the melting point of copper in an atmosphere containing oxygen, cooling said blank to a temperature of the order of room temperature and maintaining it at a temperature up to about 140° C. for an extended period.

6. The method of manufacturing copper oxide rectifiers which comprises heating a copper blank for a substantial time interval at a vacuum pressure at a temperature between 500° C. and the fusing temperature of copper, thereafter oxidizing said blank at a temperature up to the melting point of copper in an atmosphere containing oxygen, cooling said blank to a temperature of the order of room temperature and maintaining it at a temperature up to about 140° C. for a period of the order of days in duration.

7. The method of manufacturing copper oxide rectifiers which comprises heating a copper blank for a substantial time interval at a vacuum pressure at a temperature between 500° C. and the fusing temperature of copper, thereafter oxidizing said blank at a temperature up to the melting point of copper in an atmosphere containing oxygen, cooling said blank to a temperature of the order of room temperature, removing any cupric oxide present from the surface of said blank, providing electrical contacts to the mother metal of the blank and to the outer surface of the cupric oxide layer, and raising the unit thus produced to a temperature up to about 140° C. and maintaining it at the last-mentioned temperature for a long time.

8. The method of manufacturing copper oxide rectifiers which comprises heating a copper blank for a substantial time interval at a vacuum pressure at a temperature between 500° C. and the fusing temperature of copper, thereafter oxidizing said blank at a temperature up to the melting point of copper in an atmosphere containing oxygen, cooling said blank to a temperature of the order of room temperature, removing any cupric oxide present from the surface of said blank, providing electrical contacts to the mother metal of the blank and to the outer surface of the cuprous oxide layer, and raising the unit thus produced to a temperature up to about 140° C. and maintaining it at the last-mentioned temperature for a period of the order of days in duration.

CARL C. HEIN.